US009540276B2

(12) United States Patent
Qi

(10) Patent No.: US 9,540,276 B2
(45) Date of Patent: Jan. 10, 2017

(54) LOW DENSITY GLASS PARTICLES WITH LOW BORON CONTENT

(71) Applicant: 3M INNOVATIVE PROPERTIES COMPANY, St. Paul, MN (US)

(72) Inventor: Gang Qi, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/401,411

(22) PCT Filed: May 14, 2013

(86) PCT No.: PCT/US2013/040957
§ 371 (c)(1),
(2) Date: Nov. 14, 2014

(87) PCT Pub. No.: WO2013/184307
PCT Pub. Date: Dec. 12, 2013

(65) Prior Publication Data
US 2015/0132576 A1 May 14, 2015

Related U.S. Application Data

(60) Provisional application No. 61/007,071, filed on Sep. 12, 2012, provisional application No. 61/656,238, filed on Jun. 6, 2012.

(51) Int. Cl.
*C03C 3/078* (2006.01)
*C03C 3/083* (2006.01)
*C03C 3/089* (2006.01)
*C03C 3/097* (2006.01)
*C03C 11/00* (2006.01)
*C03C 1/00* (2006.01)

(52) U.S. Cl.
CPC ............. *C03C 11/002* (2013.01); *C03C 1/002* (2013.01); *C03C 3/083* (2013.01); *C03C 3/089* (2013.01); *C03C 3/097* (2013.01); *C01P 2004/51* (2013.01); *C01P 2004/61* (2013.01); *C01P 2006/10* (2013.01); *Y10T 428/2982* (2015.01)

(58) Field of Classification Search
CPC .......... C03C 11/00; C03C 3/076; C03C 3/078; C03C 3/089; C03C 3/097; C03C 2204/00; C03C 3/083; Y10T 428/2982; C01P 2005/51; C01P 2006/10

USPC .................. 501/55, 65, 66, 70, 72
See application file for complete search history.

(56) References Cited

U.S. PATENT DOCUMENTS

| | | | |
|---|---|---|---|
| 2,978,340 A | 4/1961 | Veatch | |
| 3,030,215 A | 4/1962 | Veatch | |
| 3,129,086 A | 4/1964 | Veatch | |
| 3,230,064 A | 1/1966 | Veatch | |
| 3,365,315 A | 1/1968 | Beck | |
| 3,961,978 A | 6/1976 | Brodmann | |
| 4,336,338 A | 6/1982 | Downs | |
| 4,391,646 A | 7/1983 | Howell | |
| 4,767,726 A | 8/1988 | Marshall | |
| 4,983,550 A | 1/1991 | Goetz | |
| 5,256,180 A | 10/1993 | Garnier | |
| 5,292,690 A | 3/1994 | Kawachi | |
| 5,591,684 A | 1/1997 | Kawachi | |
| 6,531,222 B1 | 3/2003 | Tanaka | |
| 2002/0004111 A1 | 1/2002 | Matsubara | |
| 2004/0075086 A1* | 4/2004 | Wolff et al. | 252/500 |
| 2006/0084724 A1* | 4/2006 | Senturk | 523/219 |
| 2006/0122049 A1 | 6/2006 | Marshall | |
| 2011/0152057 A1* | 6/2011 | Qi | 501/39 |

FOREIGN PATENT DOCUMENTS

| | | |
|---|---|---|
| DE | 220018 | 3/1985 |
| JP | 8-225340 | 9/1996 |
| JP | 2002-068853 | 3/2002 |
| JP | 2006-193373 | 7/2006 |
| JP | 2006193373 A | 7/2006 |
| WO | WO 2006-062566 | 6/2006 |
| WO | WO 2011/084572 | 7/2011 |
| WO | WO 2012-134679 | 10/2012 |

OTHER PUBLICATIONS

International Search Report for PCT International Application No. PCT/US2013/040957, mailed on Nov. 5, 2014, 3pgs.

* cited by examiner

*Primary Examiner* — Holly Le
(74) *Attorney, Agent, or Firm* — Bradford B. Wright

(57) ABSTRACT

Glass particles comprise glass microbubbles. The glass particles have a size distribution with a $d_{50}$ in the range of from 15 to 100 microns, and have a true density of less than 0.7 g/cm$^3$. The glass particles comprise, on an equivalent weight basis: from 50 to 70 weight percent silica; from 2 to 7 weight percent of boria; from 0.5 to 4 weight percent of weight zinc oxide; from 8 to 17 weight percent of calcia; from 0.8 to 7 weight percent of phosphorus pentoxide; and from 2 to 9 weight percent of sodium oxide.

12 Claims, No Drawings

LOW DENSITY GLASS PARTICLES WITH LOW BORON CONTENT

FIELD

The present disclosure broadly relates to hollow glass microbubbles, and methods of making and using them.

BACKGROUND

Glass microbubbles, also known in the art as "hollow glass microspheres" or "glass microballoons", typically have low specific gravity, satisfactory heat resistance, heat insulating properties, pressure-resistance (e.g., crush strength) and impact resistance, and may achieve superior physical properties when substituted for conventional fillers.

Accordingly, glass microbubbles are used in applications such as molding parts (e.g., including a molding compound for electric household appliances, portable electronic devices and automobiles), putties, sealing materials, a buoyancy material for ships, a synthetic wood, a reinforcing cement outer wall material, a light weight outer wall material, and artificial marble. Also, due to the structure of hollow particles, glass microbubbles may have a low dielectric constant that can be imparted as a bulk property to compositions in which they are contained.

Glass microbubbles can be prepared using a variety of processes and materials. In some cases, the product made from these processes and materials is multi-cellular, weak, not chemically durable, and/or has other limiting characteristics. For some applications, consistently higher quality single -cell glass microbubbles are required. It is particularly desirable to obtain high strength to density ratios.

Glass microbubbles are typically formed by heating frit containing a blowing agent (i.e., also known as a "feed") in a flame, thereby causing expansion and formation of glass microbubbles. The microbubbles thus formed, known in the art as "raw product", are typically accompanied by unexpanded glass beads, broken glass microbubbles, and/or glass frit. The raw product may be further processed, for example, by classification and/or flotation to further purify and isolate the glass microbubbles.

SUMMARY

In one aspect, the present disclosure provides glass particles comprising glass microbubbles, wherein the glass particles have a size distribution with a $d_{50}$ in the range of from 15 to 100 microns, wherein the glass particles have a true density of less than 0.7 g/cm$^3$, and wherein the glass particles comprise, on an equivalent weight basis: from 50 to 70 percent of silica (i.e., $SiO_2$); from 2 to 7 percent of boria (i.e., $B_2O_3$); from 0.5 to 4 percent of zinc oxide (i.e., ZnO); from 8 to 17 percent of calcia (i.e., CaO); from 0.8 to 7 percent of phosphorus pentoxide (i.e., $P_2O_5$); and from 2 to 9 percent of sodium oxide (i.e., $Na_2O$).

In certain embodiments, the present disclosure provides low-boron-content glass particles comprising glass microbubbles and having an 80 percent crush strength of at least 3500 psi (20.6 MPa).

Advantageously, glass particles according to the present disclosure have reduced boron content as compared to conventional glass microbubbles with comparable true density and 20 percent crush strength. Moreover, the glass particles can be made from recycled glass (e.g., using up to 100 percent of recycled glass as the glass frit source), thereby reducing glass waste in the environment. Further, cost is reduced since boron is a relatively expensive ingredient in comparison to other required ingredients in glass microbubbles according to the present disclosure.

Additionally, stability of the aqueous composition used to form the feed is improved by reducing the boron content, by reducing the tendency of the feed to crystallize, for example, at high solids content (e.g., about 50 weight percent based on the total weight of the aqueous composition).

For those applications wherein glass microbubbles are included in cement (e.g., as used in oil wells) excessive boron content may interfere with curing of the cement. Accordingly, low boron content is typically beneficial.

Lastly, increasing the boron content in the agglomerate generally raises the melting temperature of the feed. Accordingly, reducing the born content may result in lower processing temperatures.

In this application:

The term "80 percent crush strength" is determined according to the 80 Percent Crush Strength Test, in the Examples section hereinbelow.

The term "aqueous" means containing at least 5 percent (e.g., at least 10, 20, 30, 40, 50, or even at least 60 percent) by weight of water.

The term "$d_5$" refers to that particle diameter at which 5 percent by volume of the particles in a distribution of particles have that diameter or a smaller diameter.

The term "$d_{50}$" refers to that particle diameter at which 50 percent by volume of the particles in a distribution of particles have that diameter or a smaller diameter.

The term "$d_{95}$" refers to that particle diameter at which 95 percent by volume of the particles in a distribution of particles have that diameter or a smaller diameter.

The term "equivalent basis" in reference to an elemental oxide refers to the total amount of atoms included in the specified elemental oxide contained in a specified original composition, regardless of their actual arrangement in the specified original composition. For example, one mole of spinel (i.e., $MgAl_2O_4$), a mixed oxide of magnesium and aluminum may be considered to contain, on an equivalent basis, one mole each of MgO and $Al_2O_3$. Likewise, one mole of aluminum phosphate (i.e., $AlPO_4$) contains half a mole each of $Al_2O_3$ and $P_2O_5$.

The term "feed" means glass feed combined with all other batch components such as, for example, metal oxide powders and small amounts of additives such as binders.

The term "glass" includes all amorphous solids or melts that can be used to form amorphous solids, where the raw materials used to form such glass includes various oxides and minerals. These oxides include metal oxides.

The term "glass frit" means a suitable glassy material. Exemplary glassy materials include those disclosed in U.S. Pat. Nos. 2,978,340 (Veatch et al.); 3,030,215 (Veatch et al.); 3,129,086 (Veatch et al.); and 3,230,064 (Veatch et al.); 3,365,315 (Beck et al.); and 4,391,646 (Howell).

The term "glass feed" means recycled glass, milled and optionally classified glass frit, and/or combinations thereof used to produce glass microbubbles.

The term "microbubbles" refers to substantially spherical hollow particles, each having a substantially single-cell structure, wherein the particles have a size distribution with a $D_{90}$ is less than 1 millimeter.

The term "recycled glass" means any commonly available waste glass. Recycled glass useful in the present disclosure includes previously manufactured and used silicate glass such as, for example, soda lime silicate glass. Soda lime silicate glass is typically used in the manufacturing of, for example, glass bottles and glass windows.

The term "weight percent" in reference to a component of an article refers to the percentage by weight of the component relative to the total weight of the article as a whole.

Numerical ranges in this application are inclusive of their end points unless clearly specified otherwise, for example, by a modifier such as "greater than" or "less than".

The features and advantages of the present disclosure will be further understood upon consideration of the detailed description as well as the appended claims.

DETAILED DESCRIPTION

Glass particles and/or glass microbubbles according to the present disclosure comprise, on an equivalent basis based on the total weight of the glass particles and/or glass microbubbles: from 50 to 70 weight percent (e.g., from 55 to 65 weight percent) of silica; from 2 to 7 weight percent (e.g., from 3 to 6 weight percent, or from 4 to 5 weight percent) of boria; from 0.5 to 4 weight percent (e.g., from 1 to 3 weight percent, or from 1.5 to 2.5 weight percent) of zinc oxide; from 8 to 17 weight percent (e.g., from 10 to 15 weight percent, or from 11 to 13 weight percent) of calcia; from 0.8 to 7 weight percent (e.g., from 1 to 5 weight percent, from 1.8 to 2.3 weight percent, or from 1.9 to 2.1 weight percent) of phosphorus pentoxide; from 2 to 9 weight percent (e.g., from 4 to 8 weight percent, or from 5 to 7 weight percent) of sodium oxide. Optionally, glass particles and/or glass microbubbles according to the present disclosure further comprise, on an equivalent basis, up to about 0.3 weight percent (e.g., from 0.6 to 1.5 weight percent, or from 0.7 to 1.2 weight percent, or from 0.8 to 1.1 weight percent) of sulfur trioxide from 0.5 to 2 weight percent of sulfur trioxide (i.e., $SO_3$). The glass microbubbles may further comprise, on an equivalent weight basis, from greater than 0 to 5 weight percent (e.g., from 0.01 to 3 weight percent, or from 1 to 3 weight percent) of alumina (i.e., $Al_2O_3$).

Advantageously, glass microbubbles according to the present disclosure need not comprise titanium or zirconium, which in the case of titania may tend to increase cost and in the case of zirconia may increase density and/or cost. Accordingly, the glass microbubbles may be free of zirconia and/or titania. In other embodiments, the glass microbubbles may comprise, on an equivalent basis based on the total weight of the glass particles and/or glass microbubbles, less than 10 weight percent, less than 5 weight percent, less than 2 weight percent, less than 1 weight percent, less than 0.5 weight percent, less than 0.2 weight percent, less than 0.1 weight percent, or even less than 0.01 weight percent of titania, zirconia, and/or titania and zirconia combined.

In certain embodiments, the feed may further comprise additional materials such as, for example, MgO, BaO, SrO, PbO, $TiO_2$, $MnO_2$, $ZrO_2$, $Fe_2O_3$, $Sb_2O_3$, $V_2O_5$, and fluorine (as fluoride), which may act as a fluxing agent to facilitate melting of the glass composition.

Glass particles according to the present disclosure may be isolated within in a containment vessel such as, for example, a box, bucket, or bag, although this is not a requirement.

Glass particles and/or glass microbubbles according to the present disclosure may have a mean particle diameter ($d_{50}$) of less than 200 microns, less than 150 microns, less than 100 microns, or even less than 50 microns. Glass particles comprising glass microbubbles with a mean particle diameter ($d_{50}$) of less than 200 microns have utility for many purposes, some of which require certain size, shape, density and strength characteristics. For example, glass microbubbles are widely used in industry as additives to polymeric compounds where they may serve as modifiers, enhancers, rigidifiers, and/or fillers. Generally, it is desirable that the glass microbubbles be strong to avoid being crushed or broken during further processing of the polymeric compound, such as by high pressure spraying, kneading, extrusion or injection molding. For many applications, it is also desirable to provide low density glass microbubbles, for example, in applications wherein weight is an important factor.

Glass particles and/or glass microbubbles prepared according to the present disclosure advantageously have relatively low true density, generally less than 0.7 gram/cubic centimeter ($g/cm^3$). In some embodiments, the glass particles and/or glass microbubbles have a true density of less than 0.6 $g/cm^3$, or even less than 0.5 $g/cm^3$.

Glass microbubbles according to the present disclosure typically have relatively high strengths. For example, they may have an 80 percent crush strength (as defined hereinabove) of at least 3000 pounds per square inch (psi, 20.6 MPa). In some embodiments, glass microbubbles according to the present disclosure have an 80 percent crush strength of at least 3500 psi (24.1 MPa). In some embodiments, glass microbubbles according to the present disclosure have an 80 percent crush strength of at least 4000 psi (25.6 MPa). In some embodiments, glass microbubbles according to the present disclosure have an 80 percent crush strength of at least 4500 psi (31.0 MPa).

Glass microbubbles according to the present disclosure have substantially single cell structures. The term "substantially" as used herein means that the majority of the glass microbubbles according to the present disclosure have single cell structures. The term "single cell structure" as used herein means that each glass microbubble is defined by only one outer wall with no additional exterior walls, partial spheres, concentric spheres, or the like present in each individual glass microbubble.

Glass microbubbles can be made by heating milled frit, commonly referred to as "feed", that includes a blowing agent. The blowing agent is typically present in the feed in an amount greater than about 0.1 weight percent (e.g., at least 0.2 weight percent, 0.3 weight percent, 0.4 weight percent, or even at least 0.5 weight percent) based on the total weight of the feed. Conventional methods for making glass microbubbles include the steps of: glass melting, glass frit milling, and flame formation. A key to this process is that the glass composition used to form the glass microbubble includes a blowing agent prior to formation of the glass microbubble using a flame. The blowing agent is typically a compound or composition that, when heated, liberates a blowing gas by one or more of combustion, evaporation, sublimation, thermal decomposition, gasification or diffusion.

Glass particles and glass microbubbles according to the present disclosure can be made from feed by a variety of known processes. For example, one such process of making glass microbubbles includes simultaneous fusion of glass-forming components and expansion of the fused mass. In another process, a glass composition containing an inorganic gas forming agent, or blowing agent, is heated to a temperature sufficient to liberate the blowing agent. Yet another process includes pulverizing a material by wet pulverization to obtain a slurry of a pulverized powder material, spraying the slurry to form liquid droplets, and heating the liquid droplets to fuse or sinter the powder material in order to obtain inorganic glass microbubbles. In still another process, low density glass microbubbles may be produced from by processing precisely formulated feed mixtures in an entrained flow reactor under partially oxidizing conditions with a carefully controlled time-temperature history.

Blowing agents are also sometimes referred to as foaming agents or expanding agents. Structurally or chemically bound water has been described as a blowing agent; however, without wishing to be bound by theory, it is believed that when using relatively higher melting glass compositions, structurally/chemically bound water is removed too early in the process to be an effective blowing agent. The use of blowing agents that are not effective blowing agents may produce malformed bubbles and/or solid beads. As a result, not all compounds or components that liberate gas are effective blowing agents for the purpose of forming high quality hollow glass microbubbles. Effective blowing agents release gas at a specific rate and temperature to interact with the molten glass and create hollow cavities therein, thus forming glass microbubbles. Examples of effective blowing agents include sulfur oxides such as, for example, sulfates and sulfites. Examples of useful sulfates include metal sulfates (e.g., zinc sulfate, sodium sulfate, potassium sulfate, lithium sulfate, rubidium sulfate, magnesium sulfate, calcium sulfate, barium sulfate, and lead sulfate). Other blowing agents, such as $CO_2$, $O_2$, or $N_2$ may be included in addition to the sulfur oxides; in fact, oxygen is quite commonly present as a residue from a sulfate ion. Glass microbubbles of the present disclosure can be filled with gaseous materials after formation, but such fills are not considered in describing the amounts of ingredients in the microbubbles.

The feed may comprise at least one of recycled glass, silica sand, volcanic ash, perlite, fluorite, obsidian, silica gel, zeolite, bentonite, soda ash, borax, boric acid, zinc flour, lime, $Ca_3(PO_4)_2$, $Na_2SO_4$, $Na_4P_2O_7$, $Al_2O_3$, a compound or a salt which derives a glass -forming component such as $SiO_2$, $B_2O_3$ or $Na_2O$, or a combination thereof. Feed useful in the present disclosure may be prepared, for example, by crushing and/or milling the combined desired components. In some embodiments, the feed contains recycled glass particles blended with other types of suitable components, such as, for example, other types of suitable glasses and/or individual oxide components.

Advantageously, glass particles and/or microbubbles according to the present disclosure are typically preparable from feed comprising a high percentage (e.g., at least 40, 50, 60, 70, 80, 90, or even at least 95 weight percent) of recycled glass that was originally designed for applications other than glass microbubbles. Amounts of various elements in the feed may be the same as for the resultant glass microbubbles, but typically are different. For example, the feed may comprise, on an equivalent weight basis: from 50 to 85 weight percent (e.g., from 55 to 70, weight percent, or from 60 to 65 weight percent) of silicon dioxide; from 2 to 8 weight percent (e.g., from 2.5 to 7 weight percent, from 3 to 6.5 weight percent, or from 4 to 5 weight percent) of boria; from 0.5 to 5 weight percent (e.g., from 1 to 4 weight percent, or from 1 to 3 weight percent) of zinc oxide; from 7 to 15 weight percent (e.g., from 8 to 14, or from 9 to 13) of calcia; from 0.5 to 4.5 weight percent (e.g., from 1 to 4 weight percent, or from greater than 1.5 to 3.5 weight percent) of phosphorus pentoxide; from 6 to 14 weight percent (e.g., from 6.5 to 13 weight percent, or from 7 to 12.5 weight percent)of sodium oxide; from 0.5 to 2 weight percent of (e.g., from 0.5 to 2 weight percent, or from 0.7 to 1.2 weight percent, or from 0.8 to 1.1 weight percent) sulfur trioxide (i.e., $SO_3$). In some embodiments, based on total solids of the aqueous composition, the aqueous composition further comprises, on an equivalent weight basis, from greater than zero to 6 weight percent of alumina The feed may be prepared, for example, by forming an aqueous composition comprising recycled glass particles and a blowing agent and spray drying the aqueous composition.

Additional ingredients can be included in the feed, for example, to contribute particular properties or characteristics (e.g., hardness or color) to the resultant glass microbubbles.

The feed is typically sufficiently fine to pass through an 80 mesh sieve (typical opening size=0.178 millimeters). To achieve this, it may be milled, and optionally classified, to produce feed of suitable particle size for forming glass microbubbles of the desired size. Methods that are suitable for milling the feed include, for example, milling using a bead or ball mill, attritor mill, roll mill, disc mill, jet mill, or combination thereof. For example, to prepare feed of suitable particle size for forming glass microbubbles, the feed may be coarsely milled (e.g., crushed) using a disc mill, and subsequently finely milled using a jet mill. Jet mills are generally of three types: spiral jet mills, fluidized-bed jet mills, and opposed jet mills, although other types may also be used.

In some embodiments, the feed for producing the glass microbubbles can be produced by combining a primary component, and optionally, a binding agent (binder) in an aqueous composition (e.g., an aqueous dispersion or slurry). In addition to water, the aqueous composition may further comprise water-soluble organic solvents such as, for example, organic ethers (e.g., diglyme, glyme, dioxane), ketones (e.g., acetone), amides (e.g., N-vinylpyrrolidinone or N,N-dimethylacetamide), and/or alcohols (e.g., methanol, ethanol, propanol).

Binding agents useful in the present disclosure are useful to intimately bind individual particles in the feed as an agglomerate. Exemplary binding agents useful in the present disclosure include sugar, starch, and carboxymethyl cellulose commercially available as CELLGUM from Ashland Aqualon, Wilmington, Del. The aqueous composition is then dried to produce the feed, which is generally a substantially solid agglomerate mixture of its constituent materials.

Typically, the mixing step provides an aqueous composition, which is later dried. Mixing can be performed by any conventional means used to blend ceramic powders. Examples of suitable mixing techniques include, but are not limited to, agitated tanks, ball mills, single and twin screw mixers, and attrition mills. Certain mixing aids such as, surfactants may be added in the mixing step, as appropriate. Surfactants, for example, may be used to assist with mixing, suspending and dispersing the particles. Drying is typically performed at a temperature in the range of about 30° C. to 300° C. Any type of dryer customarily used in industry to dry slurries and pastes may be used. In some embodiments, drying may be performed in a spray dryer, fluid bed dryer, rotary dryer, rotating tray dryer, pan dryer, or flash dryer. Desirably, drying is performed using a spray dryer. Spray dryers are well-known to those of ordinary skill in the art.

In addition to the aforementioned advantages, it is generally desirable to synthesize glass microbubbles having a predetermined average particle size and a predetermined, typically narrow, particle size distribution. The use of a spray dryer in certain embodiments of the present disclosure has been found to reduce the need for any sizing/classification of the feeds or, ultimately, the glass microbubbles. Spray drying has the additional advantage of allowing a high throughput of material and fast drying times. Hence, in certain embodiments of the present disclosure, the drying step is performed using a spray dryer.

Particle size and particle size distribution can be affected by one or more of the following parameters in the spray drying process: inlet slurry pressure and velocity (particle size tends to decrease with increasing pressure); design of the atomizer (rotary atomizer, pressure nozzle, two fluid nozzle or the like) design of the gas inlet nozzle; volume flow rate and flow pattern of gas; and slurry viscosity and effective slurry surface tension.

Desirably, the aqueous composition feeding the spray dryer comprises about 25 to 70 weight percent solids, or from about 30 to 50 weight percent of solids.

Desirably, the dried feed particles have an average particle size in the range of from 5 to 150 microns, more desirably from 6 to 100 microns, more desirably from 8 to 50 microns, and even more desirably from about 10 to 30 microns. The particle size of the feed will be related to the particle size of the resultant glass microbubble, although the degree of correspondence will, of course, only be approximate. If necessary, standard comminuting/sizing/classification techniques may be employed to achieve a desired average particle size.

In addition to the ingredients described above, the aqueous composition may contain further processing aids or additives to improve mixing, flowability, or droplet formation in the spray dryer. Suitable additives are well known in the spray drying art.

In the spray drying process, the aqueous composition is typically pumped to an atomizer at a predetermined pressure and temperature to form slurry droplets. The atomizer may be one or a combination of the following: an atomizer based on a rotary atomizer (centrifugal atomization), a pressure nozzle (hydraulic atomization), or a two-fluid pressure nozzle where the slurry is mixed with another fluid (pneumatic atomization).

In order to ensure that the droplets formed are of a proper size, the atomizer may also be subjected to cyclic mechanical or sonic pulses. The atomization may be performed from the top or from the bottom of the dryer chamber. The hot drying gas may be injected into the dryer co-current or counter-current to the direction of the spraying.

By controlling the spray drying conditions, the average particle size of the feeds and the feed particle size distribution can be controlled. For example, a rotary atomizer can be used to produce a more uniform agglomerate particle size distribution than a pressure nozzle. Furthermore, rotating atomizers allow higher feed rates, suitable for abrasive materials, with negligible blockage or clogging. In some embodiments, a hybrid of known atomizing techniques may be used in order to achieve agglomerate feeds having the desired characteristics.

The atomized droplets of slurry are dried in the spray dryer for a predetermined residence time. The residence time can affect the average particle size, the particle size distribution and the moisture content of the resultant feeds. The residence time is typically controlled to give the desired characteristics of the feed, as described above. The residence time can be controlled by the water content of the slurry, the slurry droplet size (total surface area), the drying gas inlet temperature and gas flow pattern within the spray dryer, and the particle flow path within the spray dryer. Desirably, the inlet temperature in the spray dryer is in the range of about 120 to 300° C. and the outlet temperature is in the range of about 90 to 150 ° C.

Desirably, the amount of recycled glass comprises at least about 45 weight percent, in some embodiments at least about 50 weight percent, in some embodiments at least about 60 weight percent, in some embodiments at least about 70 weight percent, and in some embodiments up to and including 90 weight percent, in some embodiments up to and including 95 weight percent or 100 weight percent, where the weight percents are based on the total weight of the feed from which the glass particles are derived.

The feed, produced by the method described above, is fed into a heat source (e.g. natural gas/air or natural gas/air/oxygen flame) to produce glass microbubbles (expanded glass microbubbles). The flame may be neutral, reducing or oxidizing. The natural gas/air and/or natural gas/air/oxygen ratio may be adjusted to yield glass microbubbles of varying densities and strengths. The feed is heated to a heating temperature that fuses the feed into a melt, reduces the viscosity of the melt, seals the surface of the feed and promotes expansive formation of gas within the melt to form raw product containing the glass microbubbles. The heating temperature should also desirably maintain the melt at a temperature and time sufficient to allow the internal bubbles to coalesce and form a single primary internal void within the glass microbubbles. The glass microbubbles are then cooled, thus forming hollow glassy glass microbubbles.

Glass particles according to present disclosure may be used in a wide variety of applications, for example, in filler applications, modifier applications, containment applications or substrate applications. For example, glass particles according to the present disclosure may be used as fillers in composite materials, where they impart properties of cost reduction, weight reduction, improved processing, performance enhancement, improved machinability and/or improved workability. More specifically, the glass particles may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (e.g., precise concrete structures, tilt up concrete panels, columns, or suspended concrete structures), putties (e.g., for void filling and/or patching applications), wood composites (e.g., particleboards, fiberboards, wood/polymer composites, and other composite wood structures), clays, and ceramics. One particularly useful application is in fiber cement building products.

The glass particles according to the present disclosure may also be used as modifiers in combination with other materials. By appropriate selection of size and geometry, the glass particles may be combined with certain materials to provide unique characteristics such as, for example, increased film thickness, improved distribution, and/or improved flowability. Typical modifier applications include light reflecting applications (e.g. highway markers and signs), industrial explosives, blast energy absorbing structures (e.g. for absorbing the energy of bombs and explosives), paints and powder coating applications, grinding and blasting applications, earth drilling applications (e.g., cements for oil well drilling), adhesive formulations and acoustic or thermal insulating applications.

Glass microbubbles may be used to contain and/or store other materials. Typical containment applications include medical and medicinal applications (e.g., microcontainers for drugs), micro-containment for radioactive or toxic materials, and micro-containment for gases and liquids.

The glass particles may also be used in to provide specific surface activities in various applications where surface reactions are used such as substrate applications. Surface activities may be further improved by subjecting the glass microbubbles to secondary treatments, such as, for example, metal or ceramic coating, and/or acid leaching. Typical substrate applications include ion exchange applications for removing contaminants from fluid, catalytic applications in which the surface of the glass microbubble is treated to serve as a catalyst in synthetic, conversion or decomposition reactions, filtration where contaminants are removed from gas or liquid streams, conductive fillers or RF shielding fillers for polymer composites, and medical imaging.

Glass particles according to the present disclosure are loosely packed assemblages of particles. By the term "loosely-packed" it is meant that the glass particles are in close proximity (typically in contact with other glass particle (s), however this is not a requirement) and substantially free -flowing. Loosely packed glass particles may be confined within a container such as, for example, a bag, a box, or a drum.

While glass particles according to the present disclosure are ordinary handled in loosely -packed form, they may also be tightly-packed, that is, in the absence of any binding material, the glass particles by themselves do not flow freely.

SELECT EMBODIMENTS OF THE PRESENT DISCLOSURE

In embodiment 1, the present disclosure provides glass particles comprising glass microbubbles, wherein the glass particles have a size distribution with a $d_{50}$ in the range of from 15 to 100 microns, wherein the glass particles have a true density of less than 0.7 g/cm$^3$, and wherein the glass particles comprise, on an equivalent weight basis: from 50 to 70 percent of silica, from 2 to 7 percent of boria, from 0.5 to 4 percent of zinc oxide, from 8 to 17 percent of calcia, from 0.8 to 7 percent of phosphorus pentoxide, and from 2 to 9 percent of sodium oxide.

In embodiment 2, the present disclosure provides glass particles according to embodiment 1, wherein the glass particles are loosely packed.

In embodiment 3, the present disclosure provides glass particles according to embodiment 1 or 2, wherein, on an equivalent basis, the glass particles comprise less than 10 percent or more of titania and zirconia combined.

In embodiment 4, the present disclosure provides glass particles according to any one of embodiments 1 to 3, wherein the glass particles further comprise, on an equivalent weight basis, greater than zero and less than 5 percent of alumina In embodiment 5, the present disclosure provides glass particles according to any one of embodiments 1 to 4, wherein the glass particles have an 80 percent crush strength of at least 3500 psi.

In embodiment 6, the present disclosure provides glass particles according to any one of embodiments 1 to 4, wherein the glass particles have an 80 percent crush strength of at least 4000 psi.

In embodiment 7, the present disclosure provides glass particles according to any one of embodiments 1 to 4, wherein the glass particles have an 80 percent crush strength of at least 4500 psi.

In embodiment 8, the present disclosure provides glass particles according to any one of embodiments 1 to 7, wherein the glass particles have a true density of less than 0.6 g/cm3.

In embodiment 9, the present disclosure provides glass particles according to any one of embodiments 1 to 7, wherein the glass particles have a true density of less than 0.5 g/cm3.

In embodiment 10, the present disclosure provides glass particles according to any one of embodiments 1 to 9, wherein the glass particles have a d95 less than 200 microns.

In embodiment 11, the present disclosure provides glass particles according to any one of embodiments 1 to 10, wherein the glass microbubbles comprise at least 90 weight percent based on the total weight of the glass particles.

In embodiment 12, the present disclosure provides glass particles according to any one of embodiments 1 to 10, wherein the glass microbubbles comprise at least 95 weight percent based on the total weight of the glass particles.

In embodiment 13, the present disclosure provides glass particles according to any one of embodiments 1 to 10, wherein the glass microbubbles comprise at least 99 weight percent based on the total weight of the glass particles.

Objects and advantages of this disclosure are further illustrated by the following non -limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise specified raw materials were obtained from Sigma Aldrich, St. Louis, Mo.

Recycled glass used in the examples was tricolored recycled container glass (80 mesh), consisting of a blend of white (flint), amber and emerald green (green) recycled glasses obtained from Strategic Materials Inc., Houston, Tex.

Test Methods
Average Particle Density Determination

A fully automated gas displacement pycnometer obtained as ACCUPYC 1330 PYCNOMETER from Micromeritics, Norcross, Ga., was used to determine the density of microspheres according to ASTM D2840-69, "Average True Particle Density of Hollow Microspheres."
Particle Size Determination Particle size distribution was determined using a BECKMAN COULTER LS 13 320 particle size analyzer from Beckman Coulter, Fullerton, Calif.
80 Percent Crush Strength Test The strength of glass microbubbles (equivalent to hollow glass microspheres) was measured using ASTM Test Method D3102 -78 (1982); "HYDROSTATIC COLLAPSE STRENGTH OF HOLLOW GLASS MICROSPHERES" with exceptions. The sample size of hollow microspheres was 10 mL, the hollow microspheres were dispersed in glycerol (20.6 g), and data reduction was automated using computer software. The 80 percent crush strength value reported herein is the hydrostatic pressure at which 20 percent by volume of the glass microbubbles collapse.
Chemical Analysis of Hollow Microspheres The samples were prepared in duplicate. 40 mg of sample was weighed to the nearest 0.1 mg into polypropylene 50-ml centrifuge tubes. 3.6 mL of 2.5% aqueous mannitol and 2.4 mL of concentrate hydrochloric acid were then added to the sample tubes and to another two empty tubes for use as controls. The solutions were mixed before adding 1.2 mL of concentrate nitric acid and 0.8 mL of 50% ultrapure hydrofluoric acid. The mixtures turned into clear solutions after sonication. The tubes were then filled up to the 50-mL marker with 18-Me deionized water. The solutions were diluted 10-fold and 100-fold respectively prior to ICP-AES analysis.

Concentrations were corrected for impurities in the acid blanks. An entry marked with a "less than" symbol indicates that the concentration is less than the specified detection limit (3σ). The reported uncertainties are one standard deviation of the duplicate measurements, rounded up to provide an appropriate number of significant figures for the average concentrations.

The instrument used for elemental analysis was a Perkin Elmer Optima 8300DV ICP optical emission spectrophotometer. The sample was analyzed against external calibration curves generated using acid-matched solution standards containing 0, 0.2, 0.5, and 1 ppm of each analyte. A 0.5 ppm quality-control standard was used to monitor the accuracy of the calibration curves during the analysis. A 0.5 ppm solution of scandium was run in-line with the samples and standards to serve as an internal standard. The elements screened during this analysis were Al, As, B, Ba, Ca, Cd, Co, Cr, Cu, Fe, K, Li, Mg, Mn, Mo, Na, Ni, P, Pb, S, Sb, Si, Sn, Sr, Ti, V, Zn, and Zr.

Examples 1-4 and Comparative Examples A-D

Materials:

Tricolored recycled container glass (80 mesh) was obtained from Strategic Materials Inc., Tex. On an equivalent basis, analysis of the glass according to the Chemical Analysis of Hollow Microspheres method (above) was 2.07 weight percent of $Al_2O_3$, 0.04 weight percent of $B_2O_3$, 12.18 weight percent of CaO, 13.49 weight percent of $Na_2O$, 0.02 percent of $P_2O_5$, 0.27 weight percent of $SO_3$, 69.54 weight percent of $SiO_2$, and 0.01 weight percent of ZnO.

Boric acid: obtained from EMD Chemicals, Gibbstown, N.J.

Sugar: obtained from Domino Food Inc., Yonkers, N.Y.

Comparative Examples A-D and Examples 1-4

Tricolor recycled container glass (80 mesh) was milled in 700 g increments to an average particle size of about 20 microns using a fluidized bed jet mill (available under the trade designation "Alpine Model 100 APG" from Hosokawa Micron Powder Systems, Summit, N.J.

The ingredients as listed in Table 1 were added to the aqueous solution of milled particles (50 percent by weight solids) and mixed using an air driven mixer. The examples used various amounts of zinc sulfate hydrate ($ZnSO_4.7H_2O$), calcium phosphate mono basic $Ca(H_2PO_4)_2.H_2O$ and $B(OH)_3$. The mixture was milled using a media mill (commercially available under the trade designation "LABSTAR" from NETZSCH Fine Particle Technology, Exton, Pa.) and 1 mm yttrium-stabilized zirconium oxide grinding beads (commercially available from NETZSCH Fine Particle Technology) for 2.5 hours. The milling speed was of about 2000 rpm. The mixture was subsequently spray dried using a spray dryer commercially available under the trade designation "NIRO MOBILE MINOR" (from GEA Process Engineering, Hudson, Wis.) to form spherical agglomerates. The spray dryer conditions were: input air heated to about 250° C., air pressure to the spin head of about 4.5-5.5 bar (450-550 kPa), and a pump speed of about 65-80 ml/min. The spray-dried agglomerates were then passed through a natural gas/air, or natural gas/air flame, as generally described in PCT Patent Publ. No. WO2006/062566 (Marshall), incorporated herein by reference. The air and gas flow rates were air=265 liters/minute, gas=30 liters/minute.

The resultant flame-formed raw product (a mixture of glass microbubbles, broken glass microbubbles, glass frit, and unexpanded glass beads). Properties and compositions of the raw products are reported in Table 2.

Each raw product was floated in water at room temperature in a separatory funnel to separate the glass microbubbles from the other components. Properties and compositions of the floated glass microbubbles are reported in Table 3.

TABLE 1

| | FEED COMPOSITION, parts by weight | | | | | | | | | | |
|---|---|---|---|---|---|---|---|---|---|---|---|
| EXAMPLE | Recycled Glass | Boric Acid | $ZnSO_4 \cdot 7H_2O$ | $Ca(H_2PO_4)_2 \cdot H_2O$ | $CaCO_3$ | ZnO | $Na_2CO_3$ | $SiO_2$ | $Na_2SO_4$ | Sugar | Water |
| 1 | 750 | 165 | 45 | 80 | 140 | 26 | 0 | 350 | 0 | 10 | 2500 |
| 2 | 1000 | 70 | 40 | 65 | 5 | 2 | 0 | 0 | 0 | 10 | 2500 |
| 3 | 1000 | 110 | 40 | 32 | 0 | 22 | 15 | 0 | 0 | 10 | 2500 |
| 4 | 1000 | 110 | 40 | 40 | 0 | 0 | 0 | 0 | 0 | 10 | 2500 |
| Comparative Example A | 1000 | 60 | 0 | 65 | 60 | 0 | 0 | 0 | 15 | 10 | 2500 |
| Comparative Example B | 800 | 70 | 50 | 90 | 200 | 50 | 0 | 400 | 0 | 10 | 2500 |
| Comparative Example C | 1000 | 62 | 42 | 70 | 60 | 5 | 30 | 0 | 0 | 10 | 2500 |
| Comparative Example D | 0 | 130 | 48 | 75 | 150 | 27 | 150 | 1000 | 0 | 10 | 2500 |

TABLE 2

| | RAW PRODUCT COMPOSITION, equivalent basis weight percent | | | | | | | | TRUE DENSITY, | BUBBLE SIZE, microns | | | 80% CRUSH STRENGTH, |
|---|---|---|---|---|---|---|---|---|---|---|---|---|---|
| EXAMPLE | $SiO_2$ | $B_2O_3$ | ZnO | CaO | $P_2O_5$ | $Na_2O$ | $Al_2O_3$ | $SO_3$ | $g/cm^3$ | $d_5$ | $d_{50}$ | $d_{95}$ | psi (MPa) |
| 1 | 65.95 | 3.82 | 3.49 | 15.53 | 3.15 | 5.05 | 1.09 | 0.25 | 0.5496 | 6.726 | 28.89 | 44.05 | 6693 (46.15) |
| 2 | 64.90 | 1.61 | 1.47 | 13.75 | 2.73 | 10.43 | 1.81 | 0.26 | 0.5530 | 5.765 | 27.42 | 44.77 | 4638 (31.98) |

TABLE 2-continued

| EXAMPLE | RAW PRODUCT COMPOSITION, equivalent basis weight percent | | | | | | | | TRUE DENSITY, g/cm³ | BUBBLE SIZE, microns | | | 80% CRUSH STRENGTH, psi (MPa) |
|---|---|---|---|---|---|---|---|---|---|---|---|---|---|
| | SiO₂ | B₂O₃ | ZnO | CaO | P₂O₅ | Na₂O | Al₂O₃ | SO₃ | | d₅ | d₅₀ | d₉₅ | |
| 3 | 64.75 | 2.40 | 3.46 | 12.70 | 1.35 | 10.38 | 1.75 | 0.21 | 0.5770 | 5.990 | 28.43 | 46.68 | 3290 (22.68) |
| 4 | 66.16 | 2.70 | 1.20 | 13.19 | 1.70 | 10.08 | 1.78 | 0.24 | 0.5118 | 6.586 | 29.50 | 49.56 | 4193 (28.91) |
| Comparative Example A | 63.52 | 1.26 | 0.04 | 16.50 | 2.70 | 10.82 | 1.78 | 0.20 | 0.7736 | 5.185 | 25.20 | 40.87 | 3760 (25.92) |
| Comparative Example B | 64.58 | 1.24 | 4.92 | 17.34 | 2.90 | 5.95 | 1.14 | 0.20 | 0.9717 | 5.069 | 22.15 | 38.41 | 8000 (55.16) |
| Comparative Example C | 62.03 | 1.31 | 1.73 | 16.36 | 2.99 | 11.17 | 1.73 | 0.23 | 0.7253 | 5.998 | 29.35 | 47.85 | 2313 (15.95) |
| Comparative Example D | 75.07 | 3.52 | 3.46 | 9.08 | 2.85 | 3.98 | 0.17 | 0.19 | 1.1073 | 6.501 | 22.25 | 35.68 | 369 (2.54) |

TABLE 3

| EXAMPLE | FLOATED BUBBLES COMPOSITION, equivalent basis weight percent | | | | | | | | TRUE DENSITY, g/cm³ | BUBBLE SIZE, microns | | | 80% CRUSH STRENGTH, psi (MPa) |
|---|---|---|---|---|---|---|---|---|---|---|---|---|---|
| | SiO₂ | B₂O₃ | ZnO | CaO | P₂O₅ | Na₂O | Al₂O₃ | SO₃ | | d₅ | d₅₀ | d₉₅ | |
| 1 | 55.1 | 6.98 | 3.34 | 13.22 | 6.31 | 9.9 | 2.18 | <0.10 | 0.4499 | 6.944 | 29.44 | 45.02 | 6783 (46.77) |
| 2 | 51.57 | 2.75 | 1.34 | 11.03 | 5.34 | 20.1 | 3.33 | <0.10 | 0.4724 | 6.076 | 28.06 | 45.01 | 4416 (30.45) |
| 3 | 51.47 | 4.45 | 3.19 | 10.1 | 2.73 | 20.28 | 3.31 | <0.10 | 0.4394 | 6.517 | 30.09 | 46.38 | 3276 (22.59) |
| 4 | 53.42 | 4.82 | 1.09 | 10.33 | 3.41 | 19.24 | 3.35 | <0.10 | 0.4285 | 6.789 | 29.74 | 49.52 | 3926 (27.07) |
| Comparative Example A | 66.15 | 1.19 | 0.02 | 14.14 | 2.79 | 10.69 | 1.72 | 0.23 | 0.5223 | 5.641 | 29.57 | 47.21 | 2656 (18.31) |
| Comparative Example B | 55.59 | 2.21 | 4.7 | 14.87 | 5.74 | 11.62 | 2.19 | <0.10 | 0.7116 | 4.788 | 24.29 | 41.80 | 8996 (62.03) |
| Comparative Example C | 65.55 | 1.10 | 1.54 | 13.69 | 3.00 | 10.96 | 1.65 | 0.27 | 0.5509 | 5.264 | 26.50 | 41.50 | 3885 (26.79) |
| Comparative Example D | 67.28 | 5.87 | 3.17 | 7.81 | 5.62 | 7.19 | 0.33 | <0.10 | 0.7997 | 3.798 | 20.74 | 34.47 | 386 (2.67) |

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. Glass particles comprising glass microbubbles, wherein the glass particles have a size distribution with a $d_{50}$ in the range of from 15 to 100 microns, wherein the glass particles have a true density of less than 0.7 g/cm³, and wherein the glass particles comprise, on an equivalent weight basis: from 50 to 70 percent of silica, from 4 to 5 percent of boria, from 0.5 to 4 percent of zinc oxide, from 8 to 17 percent of calcia, from 0.8 to 7 percent of phosphorus pentoxide, greater than zero and less than 5 percent of alumina, and from 2 to 9 percent of sodium oxide.

2. Glass particles according to claim 1, wherein the glass particles are loosely packed.

3. Glass particles according to claim 1, wherein, on an equivalent basis, the glass particles comprise less than 10 percent of titania and zirconia combined.

4. Glass particles according to claim 1, wherein the glass particles have an 80 percent crush strength of at least 3500 psi.

5. Glass particles according to claim 1, wherein the glass particles have an 80 percent crush strength of at least 4000 psi.

6. Glass particles according to claim 1, wherein the glass particles have an 80 percent crush strength of at least 4500 psi.

7. Glass particles according to claim 1, wherein the glass particles have a true density of less than 0.6 g/cm³.

8. Glass particles according to claim 1, wherein the glass particles have a true density of less than 0.5 g/cm³.

9. Glass particles according to claim 1, wherein the glass particles have a $d_{95}$ less than 200 microns.

10. Glass particles according to claim 1, wherein the glass microbubbles comprise at least 90 weight percent based on the total weight of the glass particles.

11. Glass particles according to claim 1, wherein the glass microbubbles comprise at least 95 weight percent based on the total weight of the glass particles.

12. Glass particles according to claim 1, wherein the glass microbubbles comprise at least 99 weight percent based on the total weight of the glass particles.

* * * * *

UNITED STATES PATENT AND TRADEMARK OFFICE
CERTIFICATE OF CORRECTION

| | | |
|---|---|---|
| PATENT NO. | : 9,540,276 B2 | Page 1 of 1 |
| APPLICATION NO. | : 14/401411 | |
| DATED | : January 10, 2017 | |
| INVENTOR(S) | : Gang Qi | |

It is certified that error appears in the above-identified patent and that said Letters Patent is hereby corrected as shown below:

On the Title Page

<u>Item (60) Column 1 (Related U.S. Application Data)</u>
Line 1, delete "61/007,071," and insert -- 61/700,071, --, therefor.

In the Specification

<u>Column 6</u>
Line 3, after "alumina" insert -- . --.

<u>Column 7</u>
Line 67, delete "90to" and insert -- 90 to --, therefor.

<u>Column 9</u>
Line 51, after "alumina" insert -- . --.

<u>Column 11</u>
Line 2, delete "18-Me" and insert -- 18-MΩ --, therefor.

Signed and Sealed this
Fifth Day of September, 2017

Joseph Matal
*Performing the Functions and Duties of the
Under Secretary of Commerce for Intellectual Property and
Director of the United States Patent and Trademark Office*